United States Patent
Chen et al.

(10) Patent No.: US 10,802,716 B2
(45) Date of Patent: Oct. 13, 2020

(54) HARD DISK MANAGEMENT METHOD, SYSTEM, ELECTRONIC DEVICE, AND STORAGE MEDIUM

(71) Applicant: Hangzhou Hikvision Digital Technology Co., Ltd., Zhejiang (CN)

(72) Inventors: Wei Chen, Zhejiang (CN); Weichun Wang, Zhejiang (CN); Qiqian Lin, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 0 days.

(21) Appl. No.: 16/322,201

(22) PCT Filed: Jul. 26, 2017

(86) PCT No.: PCT/CN2017/094488
§ 371 (c)(1),
(2) Date: Apr. 4, 2019

(87) PCT Pub. No.: WO2018/024139
PCT Pub. Date: Feb. 8, 2018

(65) Prior Publication Data
US 2020/0019313 A1   Jan. 16, 2020

(30) Foreign Application Priority Data

Aug. 1, 2016  (CN) .......................... 2016 1 0632372

(51) Int. Cl.
*G06F 13/00* (2006.01)
*G06F 3/06* (2006.01)

(52) U.S. Cl.
CPC .......... *G06F 3/0604* (2013.01); *G06F 3/0653* (2013.01); *G06F 3/0655* (2013.01); *G06F 3/0676* (2013.01)

(58) Field of Classification Search
CPC .... G06F 3/0604; G06F 3/0676; G06F 3/0655; G06F 3/0653; G06F 16/176; G06F 16/122; G06F 11/3034
See application file for complete search history.

(56) References Cited

U.S. PATENT DOCUMENTS 7,571,168 B2 * 8/2009 Bahar ................... G06F 9/5011
8,543,761 B2    9/2013 Goldick
(Continued)

FOREIGN PATENT DOCUMENTS

CN    103176884 A  *  6/2013  ........... G06F 3/0653
CN    103888499      6/2014
(Continued)

OTHER PUBLICATIONS

CN Office Action dated Apr. 25, 2019; App. No. CN 201610632372.5; 7 pages.
(Continued)

*Primary Examiner* — Jing-Yih Shyu
(74) *Attorney, Agent, or Firm* — Mark E. Bandy; Rankin, Hill & Clark LLP

(57) ABSTRACT

The hard disk management system includes at least one object server and a managing server. The object server is configured for sending a first request to a managing server to obtain object hard disk information. The managing server is configured for obtaining object hard disk information corresponding to the object server after receiving the first request, and sending the object hard disk information to the object server. The object server is further configured for monitoring and managing a group of object hard disks indicated by the object hard disk information.

4 Claims, 3 Drawing Sheets

(56) References Cited

U.S. PATENT DOCUMENTS

| | | |
|---|---|---|
| 9,037,828 B2 | 5/2015 | Helman et al. |
| 9,092,441 B1 | 7/2015 | Patiejunas et al. |
| 2003/0231420 A1* | 12/2003 | Kano ................... G06F 11/3034 360/69 |
| 2013/0054968 A1 | 2/2013 | Gupta |
| 2014/0189423 A1 | 7/2014 | Carpentier et al. |
| 2014/0195847 A1* | 7/2014 | Webman ............. G06F 11/2094 714/6.22 |

FOREIGN PATENT DOCUMENTS

| | | | |
|---|---|---|---|
| CN | 103888499 A * | 6/2014 | |
| CN | 104199621 A * | 12/2014 | |
| CN | 104750756 | 7/2015 | |
| CN | 105100149 | 11/2015 | |
| CN | 107248931 A * | 10/2017 | ............. H04L 69/40 |
| CN | 109117342 A * | 1/2019 | |

OTHER PUBLICATIONS

Extended European Search Report dated May 8, 2019; App. No. EP 17836321.4; 9 pages.

\* cited by examiner

HARD DISK MANAGEMENT METHOD, SYSTEM, ELECTRONIC DEVICE, AND STORAGE MEDIUM

The present application claims the priority to a Chinese patent application No. 201610632372.5 filed with the China National Intellectual Property Administration on Aug. 1, 2016 and entitled "Hard Disk Management Method and System", which is incorporated herein by reference in its entirety.

TECHNICAL FIELD

The application relates to the field of monitoring, and in particular, to a hard disk management method and system.

BACKGROUND

Currently, in the case that object hard disks are centrally managed, due to the limited space of an object hard disk, a large number of hard disks are needed in a large cloud storage system. As shown in FIG. 1, a client reads and writes data via an IP network containing multiple object hard disks (object hard disk 1, object hard disk 2, ..., and object hard disk n, as shown in FIG. 1). A managing server MDS (also known as Metadata Server) has to manage/allocate multiple object hard disks. As a result, the managing server as central node has to manage a large number of hard disks. Moreover, as the object hard disks cannot provide state information about themselves, the host (such as the managing server MDS) has to query the state information of the hard disks in real time, which causes significant strain on the managing server.

No effective solution has been proposed for the problem of the significant strain on a managing server.

SUMMARY

Embodiments of the present application provide a method and a system for managing a hard disk to address at least the problem of the significant strain on the managing server.

According to an aspect of the present application, a hard disk management system is provided. The system includes at least one object server, configured for sending a first request to a managing server for object hard disk information; and the managing server, configured for obtaining the object hard disk information corresponding to the object server after receiving the first request, and sending the object hard disk information to the object server. The object server is further configured for monitoring and managing a group of object hard disks indicated by the object hard disk information.

Optionally, the group of object hard disks includes multiple object hard disks. The object server includes: a first monitoring unit, configured for monitoring operating states of the object hard disks and reporting the operating states of the object hard disks to the managing server; and a managing unit configured for, when receiving a read/write request, determining from the multiple object hard disks an object hard disk, on which a read/write operation corresponding to the read/write request is to be performed.

Optionally, the managing unit is specifically configured for: recording free space of each object hard disk managed by the object server; and when receiving the read/write request, determining an object hard disk with the largest free space from the multiple object hard disks managed by the object server as the target object hard disk.

Optionally, the managing unit is specifically configured for: recording the number of read/write operations being performed on each object hard disk managed by the object server; and when receiving the read/write request, determining an object hard disk with the least number of read/write operations from the multiple object hard disks managed by the object server as the target object hard disk.

Optionally, the managing server includes a second monitoring unit, which is configured for monitoring the operating state of the object server, and when it is detected that the object server fails, allocating the object hard disks managed by the object server to another object server.

According to another aspect of the present application, a hard disk management method is provided. The method includes: receiving a first request for obtaining object hard disk information; obtaining the object hard disk information corresponding to the first request; and monitoring and managing, by an object server, a group of object hard disks indicated by the object hard disk information.

Optionally, the group of object hard disks includes multiple object hard disks. Monitoring and managing, by the object server, the group of object hard disks indicated by the object hard disk information includes: monitoring operating states of the object hard disks, and reporting the operating states of the object hard disks to a managing server; and when receiving a read/write request, determining from the multiple object hard disks an object hard disk as a target object hard disk, on which a read/write operation corresponding to the read/write request is to be performed.

Optionally, determining the target object hard disk from the multiple object hard disks includes: recording free space of each object hard disk managed by the object server; and when receiving the read/write request, determining an object hard disk with the largest free space from the multiple object hard disks managed by the object server as the target object hard disk.

Optionally, determining the target object hard disk from the multiple object hard disks includes: recording the number of executions of each object hard disk managed by the object server; and when receiving the read/write request, determining an object hard disk with the least number of read/write operations from the multiple object hard disks managed by the object server as the target object hard disk.

Optionally, after obtaining the first request, the method further includes: monitoring an operating state of the object server, and when it is detected that the object server fails, allocating the object hard disks managed by the object server to another object server.

According to another aspect, an embodiment of the present application provides an electronic device including a processor and a memory. The memory stores a computer program.

The processor is configured for, when executing the computer program stored on the memory, carrying out the hard disk management method of the embodiments of the present application.

According to another aspect, an embodiment of the present application provides a computer program that, when executed, performs the hard disk management method of the embodiments of the present application.

According to another aspect, an embodiment of the present application provides a storage medium storing a computer program that, when executed, performs the hard disk management method of the embodiments of the present application.

In the above embodiments, at least one object server sends a first request to a managing server for object hard disk information. The managing server obtains object hard disk information corresponding to the object server after receiving the first request, and sends the object hard disk information to the object server. The object server monitors and manages a group of object hard disks indicated by the object hard disk information. With the above embodiments, the managing server allocates the object hard disks to at least one object server, such that the object server manages and monitors the object hard disks. The strain on the managing server is thus reduced. The problem of the significant strain on the managing server in the prior art is solved.

BRIEF DESCRIPTION OF THE DRAWINGS

The accompanying drawings described here are provided to offer further understanding of the present application, and constitute a part of the present application.

The exemplary embodiments and the descriptions thereof are intended to illustrate the present application, and by no means to construct improper definition of the present application. In the drawings.

DETAILED DESCRIPTION

Figure 1:
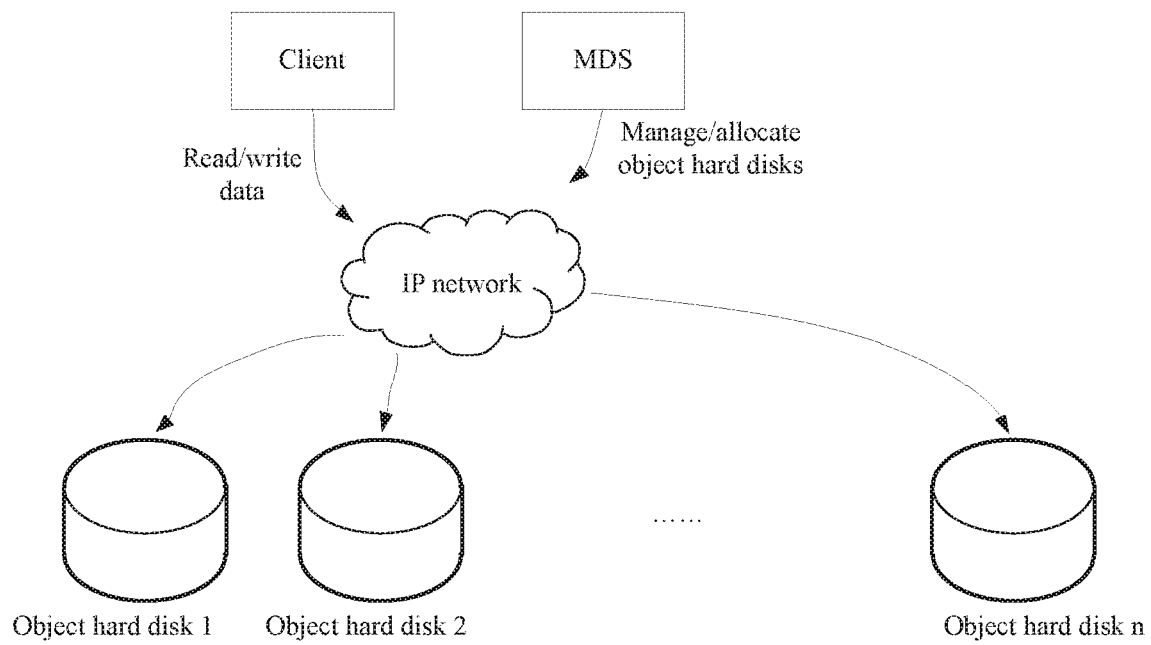
FIG. 1 illustrates the structure of a hard disk management system in the related art.

In order for those having ordinary skills in the art to better understand the technical solutions of the present application, embodiments of the present application will be described hereinafter in details with reference to the accompanying drawings. Obviously, the embodiments described herein are only part of embodiments of the present application, instead of all of them. All other embodiments obtained by those having ordinary skills in the art based on the embodiments herein, without any inventive efforts, are intended to be within the scope of the present application.

It should be noted that, in the claims and the specification of the present application, ordinal terms such as "first," "second," etc., are used merely to distinguish like objects, and do not connote any precedence or order. It should be appreciated that elements with such terms are exchangeable in suitable situations, such that the embodiments of the present application described herein may be constructed in which acts are performed in an order different from the orders shown or illustrated herein. Further, the use of "including," "containing," and any variations thereof are intended to cover a non-exclusive inclusion, such that processes, methods, objects and devices comprising a series of elements include not only those illustrated elements, but also other elements not specified or the elements inherent to those processes, methods, objects, and devices.

According to an embodiment of the present application, a hard disk management system is provided. It should be noted that the steps depicted in the flowchart in the drawings may be performed in, such as, a computer system capable of executing a set of computer executable instructions. Further, although a logical order is illustrated in the flowchart, the illustrated and described steps may be performed in an order different from those illustrated.

The terminologies used herein are explained as follows.

Object hard disk: it is an IP (Internet Protocol) hard disk that provides an IP interface. The hard disk uses the simple and common IP Ethernet technology to communicate data with a host. The IP interface makes the interconnection between the host and the hard disk simpler with almost no distance limitation. Accordingly, the performance bottleneck that a traditional SAS/SATA interface has disappears, and the scalability of a storage system is greatly increased (wherein SAS is the abbreviation of Serial Attached Small Computer System Interface; and SATA is the abbreviation of Serial Advanced Technology Attachment). A user does not have to maintain a separate storage-connecting network and only needs to maintain an IP network, therefore user's investment is reduced.

Managing server (MDS): also known as metadata server; it is a server used to organize and manage space information.

Object server (OSD, the Object Storage Server): an object storage server that is used mainly for managing online and offline tasks of hard disks and some computing tasks.

Load balancing: a set of servers is composed of multiple serves configured in a symmetric way. Each of the servers is equally privileged and able to individually provide services to external without assistance from other servers. With a load balancing technology, requests from the external are evenly distributed over the servers in the symmetric configuration. A server receiving a request from a client responds to the request independently. Load balancing makes it possible to evenly allocate requests from clients over an array of servers. As such, important data can be quickly obtained and a large amount of concurrent accesses can be handled.

Figure 2:
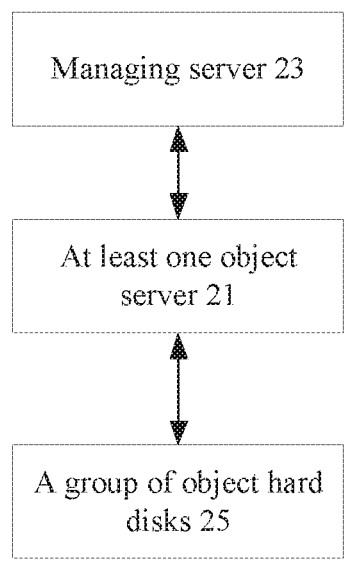
FIG. 2 is a schematic diagram of a hard disk management system according to an embodiment of the application.

FIG. 2 illustrates the structure of a hard disk management system according to an embodiment of the application. As shown in FIG. 2, the system includes the following:

at least one object server 21, configured for sending to a managing server a first request for object hard disk information; and the managing server 23, configured for obtaining object hard disk information corresponding to the object server after receiving the first request, and sending the object hard disk information to the object server. The object server is also configured for monitoring and managing a group 25 of object hard disks indicated by the object hard disk information.

With the above embodiment of the present application, the object hard disks can be managed and monitored by the at least one object server, and the object hard disks managed by the object server are allocated by the managing server, thus reducing the strain on the managing server. The problem of the significant strain on the managing server in the prior art is solved.

In the above embodiment, the object hard disk information can indicate one or more hard disks, which are object hard disks that are allocated by the managing server to object servers and are to be managed by the object servers. With the object hard disks being managed and monitored by the object servers, the strain on the managing server can be reduced.

Optionally, object hard disk information of the entire hard disk management system can be stored in a data table in advance. After receiving the first request, the managing server obtains the object hard disk information corresponding to the object server from the data table stored in advance. The data table can record addresses or serial numbers of the object hard disks to be managed by each object server.

According to the above embodiment of the present application, the group of object hard disks includes multiple object hard disks. The object server includes: a first monitoring unit for monitoring the operating states of the object hard disks and reporting the operating states of the object hard disks to the managing server; and a managing unit for, when receiving a read/write request, determining a target object hard disk from the multiple object hard disks, on which the read/write operation will be performed.

The object server can detect in real time the operating states of the object hard disks, and report the detected operating states to the managing server.

In the above embodiment, the operating states of the object hard disks may be detected in real time or may be detected periodically, which is not limited herein.

In an optional embodiment, the managing unit is specifically configured for: recording the free space of each object hard disk managed by the object server; and when receiving a read/write request, determining the object hard disk with the largest free space from the multiple object hard disks managed by the object server as the target object hard disk.

The free space means the remaining data space of the object hard disk, for example, the remaining space. For example, the data capacity of an object hard disk is 1 G and the free space may be 500M.

In the embodiment, the object server may determine the target object hard disk based on the free spaces of the object hard disks. Determining the object hard disk that has the largest free space as the target object hard disk makes it possible to properly use the spaces of the multiple object hard disks.

In another optional embodiment, the managing unit is specifically configured for: recording the number of executions on each object hard disk managed by the object server; and when receiving a read/write request, determining the object hard disk with the least number of executions from the multiple object hard disks managed by the object server as the target object hard disk.

The number of executions is the number of read/write operations being performed on the object hard disk.

In the embodiment, the object server may determine the target object hard disk based on the numbers of executions on the object hard disks. Determining the object hard disk with the least number of executions as the target object hard disk makes it possible to balance the loads of the multiple object hard disks.

In other words, in the above embodiment, the object server may determine the target object hard disk based on the numbers of executions of object hard disks. The object hard disk that has the least number of executions is determined as the target object hard disk, making it possible to balance the loads of the multiple object hard disks.

It should be further noted that, the managing server includes: a second monitoring unit for monitoring the operating state of the object server, and when it is detected that the object server fails, allocating the object hard disks managed by the object server to another object server for management.

Figure 3:
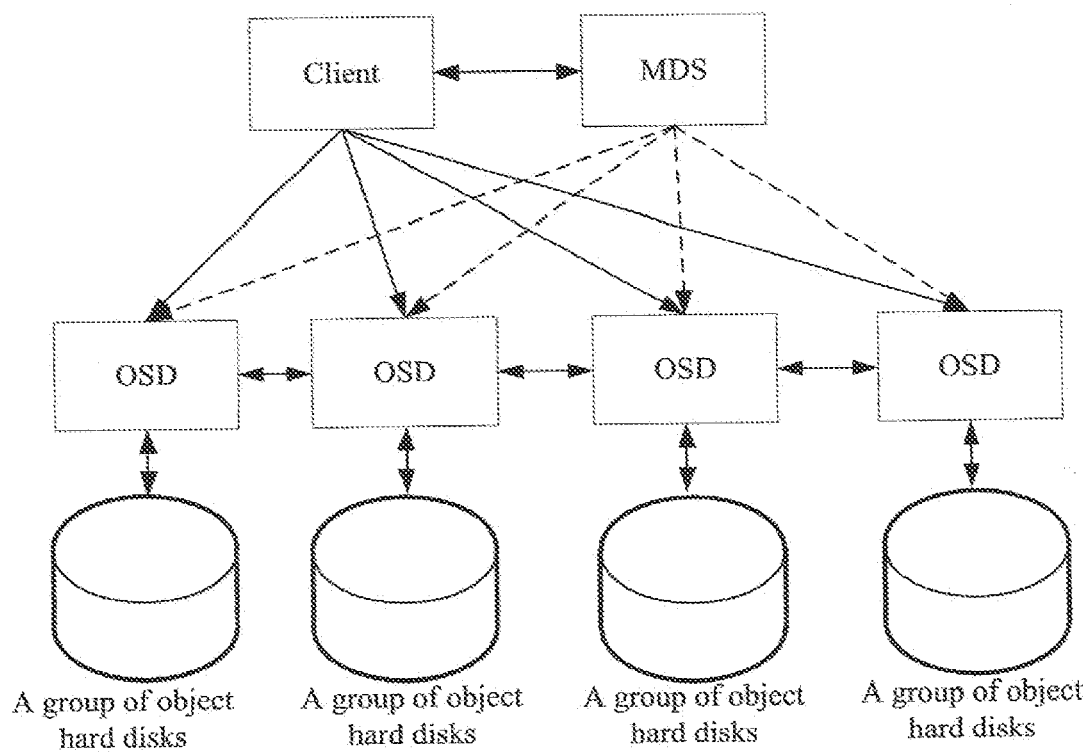
FIG. 3 illustrates the structure of a hard disk management system according to an embodiment of the application.

The above embodiment is described in detail below with reference to FIG. 3. As shown in FIG. 3, the embodiment can be realized as follows.

In the system, an OSD server(s) (i.e., the object server) is provided to monitor and manage some of hard disks and perform some of computations. Specifically, while an object hard disk can be directly connected to the MDS, now it is connected to an OSD, which is in turn connected to the MDS (i.e., the managing server). After the MDS has started its services, the OSD starts to register at the MDS and applies to manage an IP hard disk(s). When the MDS detects the registration by the OSD, it allocates some object hard disks from a stored IP table to the OSD. The OSD will be responsible for the online/off-line and writing/reading of the object hard disk.

In other words, in the embodiment of the present application, the hard disk management system is provided with an OSD server(s) (i.e., the object server, which is denoted as OSD). The OSD is added for the purpose of monitoring and managing some hard disks in the hard disk management system and performing some computations. Specifically, an object hard disk may be directly connected to the MDS (i.e., the managing server, which is denoted as MDS). In the embodiment of the application, the object hard disk can be connected to the OSD first, and the OSD is then connected to the MDS (i.e., the managing server). After the MDS has started its services, the OSD starts to register at the MDS and applies to manage an IP hard disk(s). When the MDS detects the registration by the OSD, it allocates some object hard disks from the stored IP table to the OSD. The OSD will be responsible for the online/off-line and writing/reading of the object hard disk.

The OSD will manage the hard disks after obtaining the IP list. The OSD will ping the IP in real time to check if it is works well. If the ping fails, the OSD reports corresponding object hard disk information to the MDS.

In other words, after obtaining the IP list, the OSD will manage the obtained hard disks. The OSD may detect in real time the connection (network) states of the object hard disks by the ping command. If the ping fails, i.e., if it is detected that the connection state of a hard disk is abnormal, the OSD reports the corresponding object hard disk information (i.e., object hard disk information of the object hard disk in the abnormal connection state) to the MDS.

In the above embodiment, the MDS only needs to monitor the loads of OSDs and allocate OSDs, while the read/write operation on and selection of an object hard disk are handled by an OSD.

The OSD in the above embodiment may periodically applies to the MDS for a list of IPs of the managed hard disks (i.e., the object hard disk information), and may periodically report the states of the managed object hard disks to the MDS (e.g., offline or online states). In the above embodiment, reading from/writing to an object hard disk can only be done through the OSD that manages it. An OSD does not have a read/write access to object hard disks managed by other OSDs.

Figure 4:
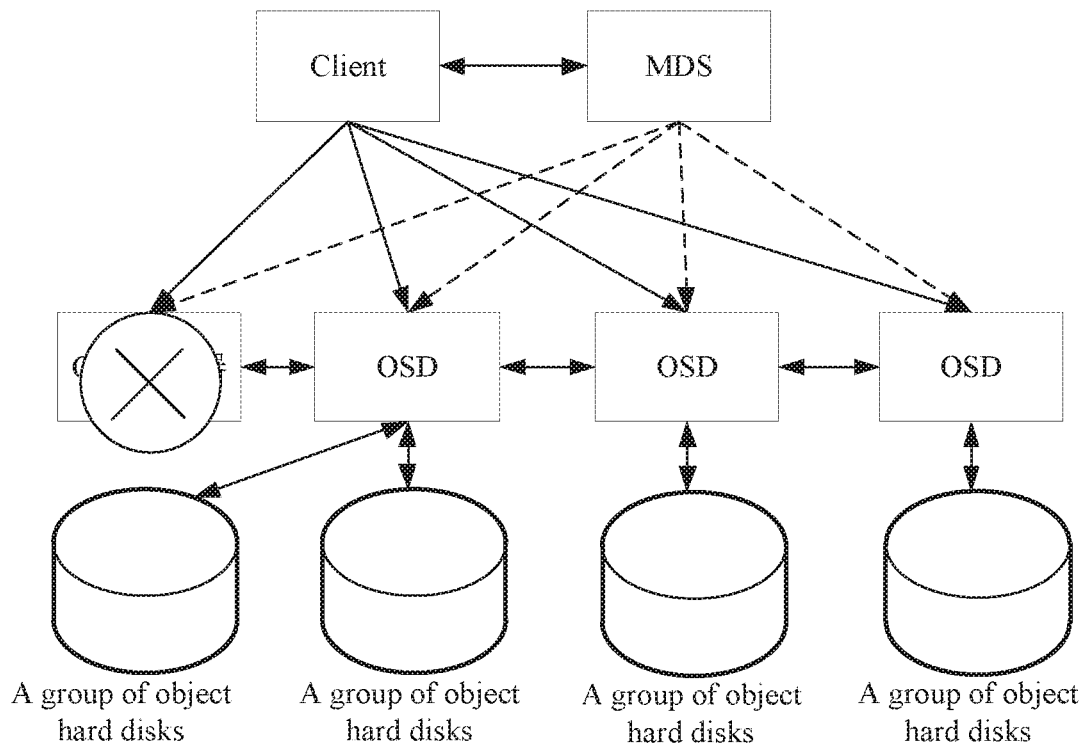
FIG. 4 illustrates the structure of another hard disk management system according to an embodiment of the application.

As shown in FIG. 4, if an OSD fails, the object hard disks managed by the OSD will be unavailable. Since the object hard disks are globally visible, the MDS may allocate an IP hard disk that is under no management to another OSD applying for managing the hard disk. The other OSD will start to perform the monitoring and reporting and is granted the read/write access.

In other words, if an OSD fails, the object hard disks managed by this OSD may be caused to be unavailable. In this situation, in the embodiment of the present application, since the object hard disks are globally visible, the MDS may allocate an IP hard disk(s) (i.e., an object hard disk) managed by the failed OSD to another OSD that applies for managing the hard disk and is not failed. This IP hard disk will be monitored and managed by the other OSD that is not failed. The OSD that is not failed has the read/write access to that IP hard disk.

It should be further noted that, as an object hard disk cannot report its space, load, or online/offline information, a load balancing is performed under the rule that an object hard disk can be read from and written to only by the OSD server that manages it.

Specifically, the OSD obtains the free space of an object hard disk by recording the size of data written into the object hard disk. One object hard disk is connected to only one OSD. The OSD counts the read/write operations performed on the object hard disk. Any read/write operation will increase the count; and once the operation is completed, the count decreases. Further, a hard disk is selected first based on the free space and then on the count, with the smallest count indicating the lowest load.

Figure 5:
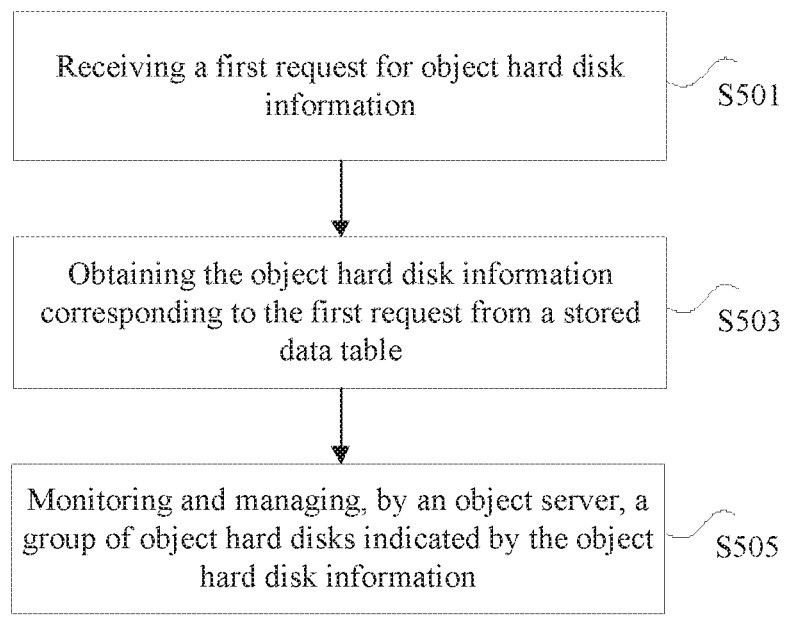
FIG. 5 is a flowchart of a hard disk management method according to an embodiment of the application.

According to an aspect of the present application, a hard disk management method is provided. As shown in FIG. 5, the method may include the following steps:

step S501: receiving a first request for object hard disk information;

step S503: obtaining the object hard disk information corresponding to the first request; and step S505: monitoring and managing, by an object server, a group of object hard disks indicated by the object hard disk information.

In the above embodiments, object hard disks can be managed and monitored by at least one object server, and the object hard disks managed by the object server are allocated by the managing server. The strain on the managing server is thus reduced. The problem of the heavy strain on the managing server in the prior art is solved.

In the above embodiments, the object hard disk information can indicate one or more object hard disks, which are object hard disks allocated, by the managing server, to and managed by the object server. With object hard disks being managed and monitored by the object server, the strain on the managing server can be reduced.

A data table recording information on all of the object hard disks in the hard disk management system can be stored in advance. After receiving the first request from the object server, the managing server obtains object hard disk information corresponding to the object server from the data table stored in advance.

Optionally, the group of object hard disks includes multiple object hard disks, and monitoring and managing, by the object server, the group of object hard disks indicated by the object hard disk information includes: monitoring the operating states of the object hard disks, and reporting the operating states of the object hard disks to the managing server; and when receiving a read/write request, determining a target object hard disk from the multiple object hard disks, on which the read/write operation is to be performed.

The object server can detect in real time the operating states of the object hard disks, and report the detected operating states to the managing server.

In the above embodiments, the operating states of the object hard disks may be detected in real time or periodically, which is not limited herein.

Optionally, determining a target object hard disk among multiple object hard disks that is used for executing the read/write request includes: recording the free space of each object hard disk managed by the object server; when receiving a read/write request, determining the object hard disk among multiple object hard disks managed by the object server that has the largest free space as the target object hard disk.

The free space means the remaining data space of the object hard disk, for example, the remaining space. For example, the data capacity of an object hard disk is 1 G and the free space may be 500M.

In the embodiment, the object server may determine the target object hard disk based on the free spaces of the object hard disks. Determining the object hard disk that has the largest free space as the target object hard disk makes it possible to properly use the spaces of the multiple object hard disks.

Optionally, determining the target object hard disk from the multiple object hard disks on which the read/write operation corresponding to the read/write request includes: recording the number of executions on each object hard disk managed by the object server; and when receiving the read/write request, determining an object hard disk with the least number of executions from the multiple object hard disks managed by the object server as the target object hard disk.

The number of executions is the number read/write operations being performed on the object hard disk.

In the embodiment, the object server may determine the target object hard disk based on the numbers of executions on the object hard disks. Determining the object hard disk that has the least number of executions as the target object hard disk makes it possible to balance the loads of the multiple object hard disks (e.g., IP hard disks).

In other words, in the above embodiment, the object server may determine the target object hard disk based on the numbers of executions on the object hard disks. The object hard disk with the least number of executions is determined as the target object hard disk. Thus, the loads of multiple object hard disks can be balanced.

Optionally, after obtaining the first request, the method further includes: monitoring the operating state of the object server, and when it is detected that the object server fails, allocating the object hard disks managed by the object server to another object server.

An embodiment of the present application further provides an electronic device, which includes a processor and a memory. The memory stores a computer program.

The processor, by executing the computer program stored on the memory, carries out the hard disk management method of the embodiments of the present application. The hard disk management method may include the following steps:

receiving a first request for obtaining object hard disk information;

obtaining the object hard disk information corresponding to the first request; and monitoring and managing, by an object server, a group of object hard disks indicated by the object hard disk information.

With the embodiment of the present application, the processor of the electronic device executes the computer program stored on the memory to carry out the hard disk management method of the embodiments of the present application. Therefore, the strain on the managing server can be reduced and the problem of the significant strain on the managing server in the prior art can be solved.

Optionally, the group of object hard disks includes multiple object hard disks, and the electric device monitors and manages the group of object hard disks indicated by the object hard disk information via the object server, specifically by:

monitoring the operating states of the object hard disks, and reporting the operating states of the object hard disks to a managing server; and when receiving a read/write request, determining from the multiple object hard disks an object hard disk as a target object hard disk, on which a read/write operation corresponding to the read/write request is to be performed.

Optionally, the electric device determines the target object hard disk from the multiple object hard disks, specifically by:

recording free space of each object hard disk managed by the object server; and when receiving the read/write request, determining an object hard disk with the largest free space from the multiple object hard disks managed by the object server as the target object hard disk.

Optionally, the electric device determines the target object hard disk from the multiple object hard disks that is used for executing the read/write request, specifically by:

recording the number of executions of each object hard disk managed by the object server; and when receiving the read/write request, determining an object hard disk with the least number of read/write executions from the multiple object hard disks managed by the object server as the target object hard disk.

Optionally, the electronic device, after obtaining the first request, is further used for:

monitoring the operating state of the object server, and when it is detected that the object server fails, allocating the object hard disks managed by the object server to another object server.

An embodiment of the present application further provides a computer program that, when executed, performs the hard disk management method of embodiments of the present application. The hard disk management method may include the following steps:

receiving a first request for obtaining object hard disk information;

obtaining the object hard disk information corresponding to the first request; and monitoring and managing, by an object server, a group of object hard disks indicated by the object hard disk information.

With the embodiment of the application, the computer program is executed to perform the hard disk management method of the embodiments of the present application. Therefore, the strain on the managing server can be reduced and the problem of the significant strain on the managing server in the prior art can be solved.

Optionally, the group of object hard disk includes multiple object hard disks, the computer program is executed to monitor and manage the group of the object hard disks indicated by the object hard disk information via an object server, specifically by:

monitoring the operating states of the object hard disks, and reporting the operating states of the object hard disks to a managing server; and when receiving a read/write request, determining from the multiple object hard disks an object hard disk as a target object hard disk, on which a read/write operation corresponding to the read/write request is to be performed.

Optionally, the computer program is executed to determine the target object hard disk from the multiple object hard disks, on which the read/write operation corresponding to read/write request is to be performed, specifically by:

recording free space of each object hard disk managed by the object server; and when receiving the read/write request, determining an object hard disk with the largest free space from the multiple object hard disks managed by the object server as the target object hard disk.

Optionally, the computer program is executed to determine the target object hard disk from the multiple object hard disks, on which the read/write operation corresponding to the read/write request is to be performed, specifically by:

recording the number of executions of each object hard disk managed by the object server; and when receiving the read/write request, determining an object hard disk with the least number of executions from the multiple object hard disks managed by the object server as the target object hard disk.

Optionally, after obtaining the first request, the computer program is executed to further perform the operations of:

monitoring the operating state of the object server, and when it is detected that the object server fails, allocating the object hard disks managed by the object server to another object server.

An embodiment of the application provides a storage medium storing a computer program that, when executed, performs the hard disk management method of the embodiments of the present application. The hard disk management method may include the following steps:

receiving a first request for obtaining object hard disk information;

obtaining the object hard disk information corresponding to the first request; and monitoring and managing, by an object server, a group of the object hard disks indicated by the object hard disk information.

With the embodiment of the application, the storage medium stores a computer program that, when executed, performs the hard disk management method of the embodiments of the present application. Therefore, the strain on the managing server can be reduced and the problem of the significant strain on the managing server in the prior art can be solved.

Optionally, the group of object hard disks includes multiple object hard disks, the computer program is executed to monitor and manage the group of the object hard disks indicated by the object hard disk information points via an object server, specifically by:

monitoring the operating states of the object hard disks, and reporting the operating states of the object hard disks to a managing server; and when receiving a read/write request, determining from the multiple object hard disks an object hard disk as a target object hard disk, on which a read/write operation corresponding to the read/write request is to be performed.

Optionally, the computer program is executed to determine the target object hard disk from the multiple object hard disks, on which the read/write operation corresponding to the read/write request is to be performed, specifically by:

recording free space of each object hard disk managed by the object server; and when receiving the read/write request, determining an object hard disk with the largest free space from the multiple object hard disks managed by the object server as the target object hard disk.

Optionally, the computer program is executed to determine the target object hard disk from the multiple object hard disks, on which the read/write operation corresponding to the read/write request is to be performed, specifically by:

recording the number of executions of each object hard disk managed by the object server; and when receiving the read/write request, determining an object hard disk with the least number of executions from the multiple object hard disks managed by the object server as the target object hard disk.

Optionally, after obtaining the first request, the computer program is executed to further perform the operations of:
monitoring the operating state of the object server, and when it is detected that the object server fails, allocating the object hard disks managed by the object server to another object server.

The serial numbers denoting the embodiments of the present application are merely for the purpose of explanation, and do not indicate merits of the embodiments.

In the above embodiments of the present application, emphasis is put on the description of each embodiment. If a part in an embodiment that is not illustrated in details, references can be made to relevant description of other embodiments.

It should be understood that the technical solutions disclosed in the several embodiments herein may be realized in other ways. The device embodiments described above are merely illustrative. For example, the units can be defined based on logical functions, and in practice they can be defined in other ways. For example, several units and components may be combined with or integrated in a system, or some features can be ignored or are not carried out. Additionally, the coupling or direct coupling or communication illustrated or discussed may be indirect coupling or communication via some interfaces, units or modules, which may be electrical coupling or coupling in any other way.

The units described as separate components may or may not be physically separated, the components depicted as a unit may or may not be a physical unit. In other words, they may be arranged in one or may be distributed on several units. Some or all of the units may be chosen to realize the objective of the embodiments of the present application based on practical need.

Further, various functional units in the embodiments of the present application may be integrated in one processing unit, or may be physically present as an individual unit, or two or more of them may be integrated in one unit. The integrated unit can be realized as hardware, or as software functional unit.

The integrated unit can be stored in a computer readable storage medium when it is realized as software functional unit and is to be sold or used as an individual product. Based on such understanding, the essence of technical solutions of the present application, or the portion of the technical solutions that contributes to the prior art, or all or part of the technical solutions can be realized as a software product. The software product is stored in a storage medium, which includes several instructions to cause a computer device (which may be a personal computer, a server or a network device, etc.) to carry out all or some of the steps of the method described in the embodiments. The above storage medium includes such as a USB disk, ROM (Read-Only Memory), RAM (Random Access Memory), mobile hard disk, magnetic disc, CD that can store program codes.

The embodiments disclosed in this application are merely preferred implementation. It should be noted that any person with ordinary skills in the art may make any improvements or modifications without departing from the principal of the present application, and these improvements and modifications are to be fall into the protection scope of the present application.

The invention claimed is:

1. A hard disk management system, comprising:
at least one object server, configured for sending a first request to a managing server for object hard disk information; and the managing server, configured for obtaining object hard disk information corresponding to the object server after receiving the first request, and sending the object hard disk information to the object server;
wherein the object server is further configured for monitoring and managing a group of object hard disks indicated by the object hard disk information, wherein the group of object hard disks comprises multiple object hard disks, and
wherein the object server comprises a managing unit, configured for, when receiving a read/write request, determining from the multiple object hard disks an object hard disk as a target object hard disk, on which a read/write operation corresponding to the read/write request is to be performed,
wherein the managing unit is further configured:
recording free space of each object hard disk managed by the object server; and when receiving the read/write request, determining an object hard disk with a largest free space from the multiple object hard disks managed by the object server as the target object hard disk, or
recording a number of read/write operations being performed on each object hard disk managed by the object server; and when receiving the read/write request, determining an object hard disk with a least number of read/write operations from the multiple object hard disks managed by the object server as the target object hard disk;
wherein the object server further comprises a first monitoring unit, configured for monitoring operating states of the object hard disks and reporting the operating states of the object hard disks to the managing server;
wherein the managing server comprises a second monitoring unit, configured for monitoring an operating state of the object server, and when it is detected that the object server fails, allocating the object hard disks managed by the object server to another object server.

2. A hard disk management method, comprising:
receiving a first request for obtaining object hard disk information;
obtaining the object hard disk information corresponding to the first request; and
monitoring and managing, by an object server, a group of object hard disks indicated by the object hard disk information, comprising when receiving a read/write request, determining from the multiple object hard disks an object hard disk as a target object hard disk, on which a read/write operation corresponding to the read/write request is to be performed,
wherein the group of object hard disks comprises multiple object hard disks, and wherein the determining of a target object hard disk comprises:
recording free space of each object hard disk managed by the object server; and when receiving the read/write request, determining an object hard disk with a largest free space from the multiple object hard disks managed by the object server as the target object hard disk, or
recording a number of read/write operations being performed on each object hard disk managed by the object server;
and when receiving the read/write request, determining an object hard disk with a least number of read/write operations from the multiple object hard disks managed by the object server as the target object hard disk;
wherein monitoring and managing the group of object hard disks further comprises monitoring operating states of the object hard disks, and reporting the operating states of the object hard disks to a managing server;

wherein after obtaining the first request, the method further comprises monitoring an operating state of the object server, and when it is detected that the object server fails, allocating the object hard disks managed by the object server to another object server.

3. An electronic device, comprising a processor and a memory, wherein the memory stores a computer program; and the processor is configured for carrying out the hard disk management method of claim 2 by executing the computer program stored on the memory.

4. A non-transitory storage medium storing a computer program that, when executed, performs the hard disk management method of claim 2.

* * * * *